(12) United States Patent
Oe

(10) Patent No.: US 11,640,103 B2
(45) Date of Patent: May 2, 2023

(54) PAN OR TILT HEAD AND IMAGING DEVICE

(71) Applicant: CANON KABUSHIKI KAISHA, Tokyo (JP)

(72) Inventor: Yusaku Oe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/504,227

(22) Filed: Oct. 18, 2021

(65) Prior Publication Data

US 2022/0146913 A1    May 12, 2022

(30) Foreign Application Priority Data

Nov. 10, 2020    (JP) .............................. JP2020-187342

(51) Int. Cl.
  *G03B 17/56*    (2021.01)
  *G08B 13/196*   (2006.01)
  *F16H 1/08*     (2006.01)

(52) U.S. Cl.
  CPC ....... *G03B 17/561* (2013.01); *G08B 13/1963* (2013.01); *F16H 1/08* (2013.01)

(58) Field of Classification Search
  CPC .. G03B 17/561; H04N 5/23299; F16M 11/08; F16M 11/12; F16M 11/126; F16H 1/08; F16H 1/206; F16H 1/227
  See application file for complete search history.

(56) References Cited

U.S. PATENT DOCUMENTS

2015/0185432 A1*    7/2015    Makita ................... G02B 7/102
                                                        348/357

FOREIGN PATENT DOCUMENTS

| JP | S59-43258 A     | 3/1984    |
|----|-----------------|-----------|
| JP | 2003-315907 A   | 11/2003   |
| JP | 2004197822 A  * | 7/2004    |
| JP | 2005-323187 A   | 11/2005   |
| JP | 2009-055076 A   | 3/2009    |

OTHER PUBLICATIONS

The above foreign documents were cited in a European Search Report dated Mar. 31, 2022, that issued in the corresponding European Patent Application No. 21201380.9.

* cited by examiner

*Primary Examiner* — Christopher E Mahoney
(74) *Attorney, Agent, or Firm* — Cowan, Liebowitz & Latman, P.C.

(57) ABSTRACT

In order to provide a pan or tilt head and the like capable of reducing rattling or vibration when a rotation is suddenly changed while reducing the unevenness in rotational speed for smooth rotational drive, there is provided a pan or tilt head including a drive unit which rotates a camera unit in a predetermined direction, first and second gears which rotate around a predetermined rotation axis in the predetermined direction and are coaxial with the predetermined rotation axis, a third gear which meshes with the first and second gears and transmits a driving force from the drive unit, and a biasing unit which biases the second gear in the rotation axis direction, the first gear, the second gear, and the third gear includes helical gears, and the second gear is disposed to be movable in the rotation axis direction with respect to the first gear.

8 Claims, 8 Drawing Sheets

PAN OR TILT HEAD AND IMAGING DEVICE

BACKGROUND OF THE INVENTION

Field of the Invention

The present invention relates to a pan or tilt head for rotating a camera unit in a predetermined direction and an imaging device.

Description of the Related Art

As imaging devices for panning and tilting camera units, video cameras used for shooting in small studios and live broadcasts are known. These cameras need to use large and heavy lens barrels to obtain high-quality images and require large driving forces. Further, in order to enable image expression with smooth camera work, smooth rotational drive in a wide speed range from a low speed to a high speed is required.

Japanese Patent Laid-Open No. 2005-323187 describes a configuration that employs a timing belt and a pulley as a rotational drive mechanism for panning and tilting in order to enable smooth rotational drive. According to Japanese Patent Laid-Open No. 2005-323187, since the timing belt can remove the backlash of the drive mechanism, the rattling when the camera is panned or tilted is reduced, and smooth rotational drive is enabled. However, since the timing belt is an elastic member, there is a problem that the image shakes due to the bending and expansion/contraction of the belt when a large lens barrel is driven or stopped at high acceleration.

On the other hand. Japanese Patent Laid-Open No. 2009-55076 describes a technique of a so-called "scissors gear" in which one of a pair of spur gears meshing with each other as the rotational drive mechanism is divided into two in a thickness direction and one of two divided gears is biased in a circumferential direction around a rotation axis by a spring or the like, in the scissors gear configuration, backlash can be removed and rattling during rotational drive can be suppressed.

FIG. 7 shows an example of a structure that uses a conventional scissors gear as a panning and tilting drive mechanism of the camera unit. As shown in FIG. 7, in the scissors gear configuration using the conventional spur gear, a first spur gear 51 is fixed to a tilting shaft 52 or a panning shaft (not shown) and meshes with a gear portion of a geared pulley 53 to transmit a driving force of a motor 56.

Here, a second spur gear 54 is biased in a circumferential direction around a rotation axis by a biasing member such as a coil spring 55. Accordingly, the teeth of the gear portion of the geared pulley 53 are sandwiched by the teeth of the first spur gear 51 and the teeth of the second spur gear 54, so that backlash can be removed.

However, in the related art disclosed in Japanese Patent Laid-Open No. 2009-55076, since the gear portion is always in strong contact with the gears on the other side due to the scissors gear biasing structure, there is concern that the unevenness in transmission torque becomes large due to the rotation phase of the gear. In particular, when the camera is panned or tilted at a low speed, unevenness in speed may occur and the image may shake.

In order to reduce the unevenness in transmission torque, it is necessary to weaken the biasing force of the spring or the like of the scissors gear. However, since a large torque is applied due to inertia when the large lens barrel is suddenly stopped from the high-speed rotation state, the torque causes the lens barrel to vibrate and causes the image to shake if the biasing force is weak.

That is, the scissors gear configuration with the spur gears has a problem as below. When the biasing force is large, the speed becomes uneven particularly at the low-speed drive state. On the other hand, when the biasing force is small, the torque generated by the inertia of the lens barrel cannot be maintained and the lens barrel shakes.

For example, in the example of the configuration shown in FIG. 7, when the biasing force to the second spur gear 54 is weak, a torque generated by the inertia of a camera unit 50 at the time of rapidly tilting or panning and suddenly stopping the camera unit 50 exceeds the force of the coil spring 55. As a result, the camera unit 50 vibrates.

On the other hand, when the biasing force to the second spur gear 54 is strong, it is possible to suppress the vibration of the camera unit at the time of tilting or panning at a high speed or sudden stopping of the camera unit. However, the teeth of the first spur gear 51 and the second spur gear 54 strongly come into contact with the teeth of the gear portion of the geared pulley 53 and large unevenness in the transmission torque occurs due to the rotation phase of the gear.

Regarding such a problem, for example, even in the control of rotating the camera unit 50 at a certain constant speed in the tilting or panning direction, the rotational speed becomes uneven due to the uneven torque, which causes the captured image to be blurred.

FIG. 8 is an example that plots the panning speed of the camera unit 50 if the biasing force to the second spur gear 54 is weak. Although the speed of the trapezoidal wave is input, it can be seen that the vibration is generated at the time of starting and stopping by looking at the actual panning speed since the force of the coil spring 55 is weak. Further, FIG. 9 is an example that plots the panning speed of the camera unit 50 if the biasing force to the second spur gear 54 is strong. In this case, it can be seen that the vibration at the time of starting and stopping can be suppressed, but the speed is not kept constant due to the unevenness of the transmission torque.

An object of the one of inventions is to provide a pan or tilt head and the like capable of reducing rattling and vibration when a rotation is suddenly changed while reducing the unevenness in rotational speed for smooth rotational drive.

SUMMARY OF THE INVENTION

In order to achieve the above-described object, a pan or tilt head of the claimed invention includes: a drive unit which rotates a camera unit in a predetermined direction; first and second gears which rotate around a predetermined rotation axis in the predetermined direction and are coaxial with the predetermined rotation axis; a third gear which meshes with the first and second gears and transmits a driving force from the drive unit; and a biasing unit which biases the second gear in the rotation axis direction, wherein the first gear, the second gear, and the third gear include helical gears, and wherein the second gear is disposed to be movable in the rotation axis direction with respect to the first gear.

Further features of the one or more embodiments of the claimed invention will become apparent from the following description of embodiments with reference to the attached drawings.

DESCRIPTION OF THE EMBODIMENTS

Hereinafter, with reference to the accompanying drawings, favorable mode of the present invention will be described using Embodiments. In each diagram, the same reference signs are applied to the same members or elements, and duplicate description will be omitted or simplified.

Further, in the embodiment, an example in which a network camera used for live streaming or the like as an imaging device is combined with a pan or tilt head for panning and tilting will be described. However, the imaging device includes an electronic device such as a digital still camera, a digital movie camera, a smartphone with a camera, a tablet computer with a camera, and an in-vehicle camera having an imaging function.

Figure 1:
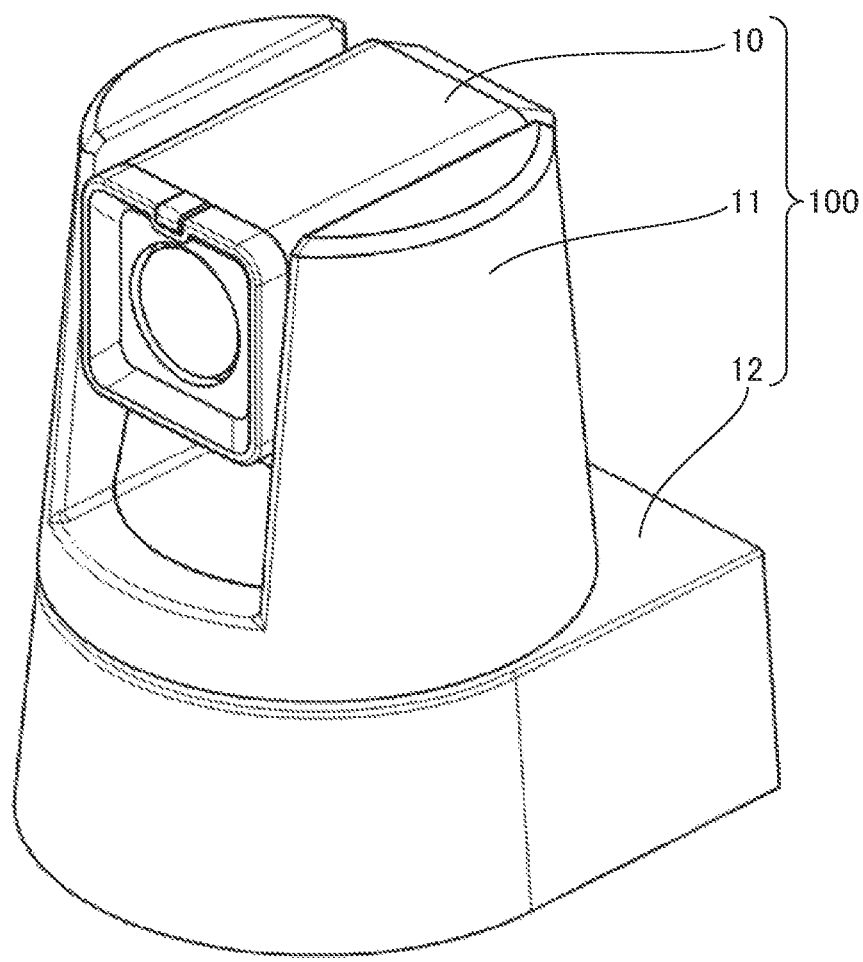
FIG. 1 is a perspective view showing a video camera of an embodiment of the present invention.

FIG. 1 is a perspective view showing a video camera 100 of the embodiment of the present invention.

As shown in FIG. 1, a video camera (network camera) 100 as the imaging device of the embodiment includes a camera unit 10, a panning unit 11, and a base portion 12.

The video camera 100 shown in FIG. 1 is installed, for example, on a ceiling of a live house or a shooting studio as a fixed surface and the camera unit 10 can be rotated in the panning direction and the tilting direction. By panning and tilting the camera unit 10 toward a subject, it is possible to shoot videos for video production and live streaming. Further, the video camera 100 can be not only installed on the ceiling but also placed on a horizontal surface to capture an image.

When the camera unit 10 is panned and tilted, it is possible to capture an image without blurring by smoothly driving the camera unit 10 without any unevenness in rotational speed. Further, the camera unit 10 can perform panning and tilting operations in a wide speed range from a high speed range to a low speed range. Therefore, even a subject moving at an uneven speed can be photographed by allowing the camera unit 10 to follow the subject.

In this way, the video camera 100 can rotate the camera unit 10 in the panning and tilting directions. Here, the panning unit 11 and the base portion 12 constitute a pan or tilt head for rotating the camera unit 10 in the panning and tilting directions. Additionally, in the embodiment, the camera unit 10 is attached to the pan or tilt head and cannot be attached or detached by the user. However, the camera unit 10 may be simply attached to or detached from the pan or tilt head.

Next, a tilting drive mechanism 200 of the video camera 100 will be described. The tilting drive mechanism 200 is disposed in the panning unit 11.

Figure 2:
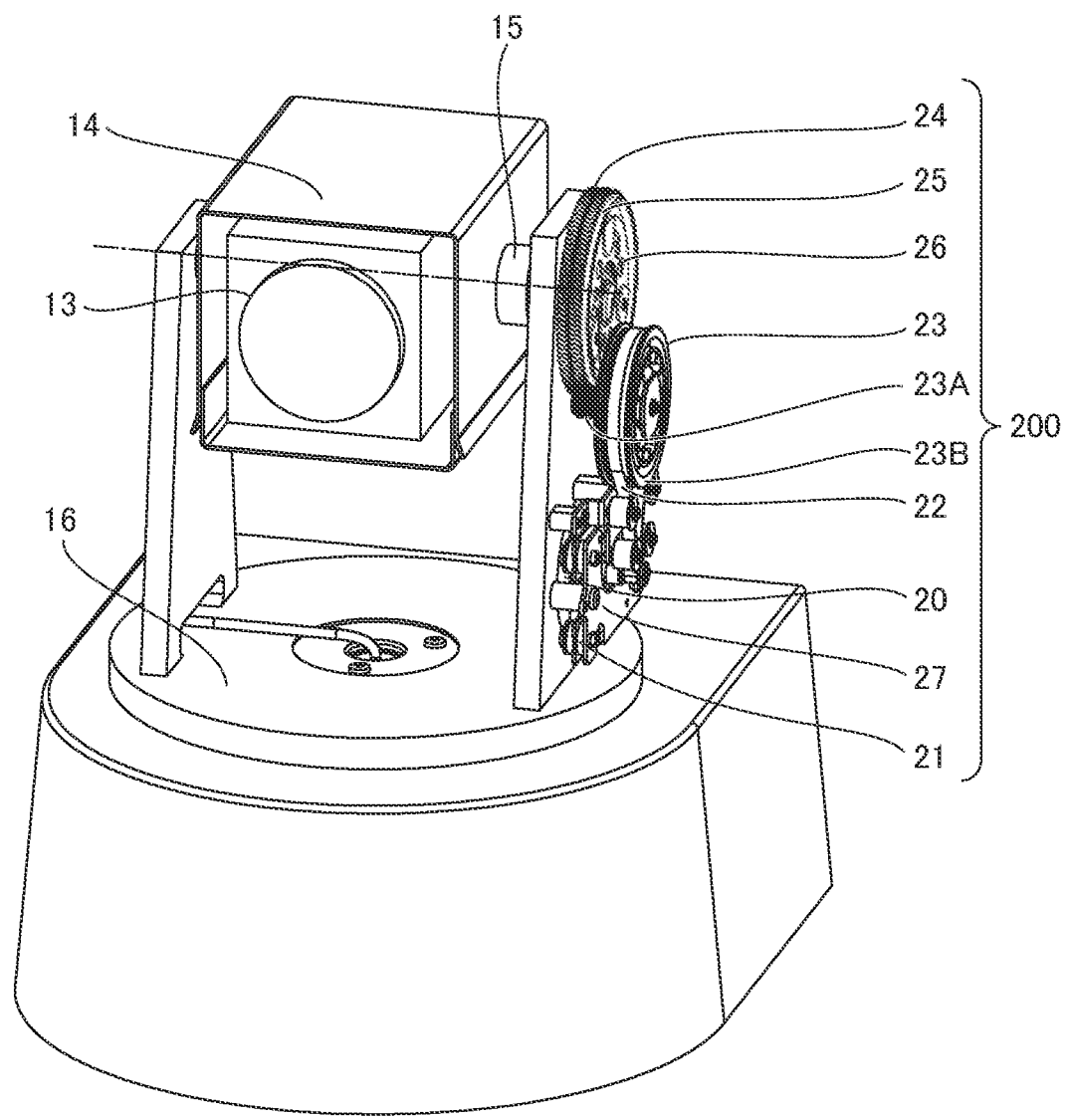
FIG. 2 is a perspective view showing a tilting drive mechanism of the video camera of the embodiment.

FIG. 2 is a perspective view showing the tilting drive mechanism 200 of the video camera 100. Additionally, the tilting drive mechanism (tilting drive unit) functions as a rotational drive unit for rotating the camera unit 10 in a predetermined tilting direction. Further, in the embodiment, a configuration in which both the rotation in the panning direction and the rotation in the tilting direction are possible will be described, but only the rotation in one direction may be possible.

As shown in FIG. 2, a lens barrel 13 in the camera unit 10 is supported by a lens barrel support member 14 and the lens barrel support member 14 includes a tilting shaft 15. The lens barrel support member 14 is tiltably supported by a pan base 16 in the panning unit 11.

Here, the rotation of the camera unit 10 in the tilting direction is performed by the tilting drive mechanism 200. The tilting drive mechanism 200 includes a tilting motor 20 which is a drive source, a rubber 21, a timing belt 22, a geared pulley 23, a first helical gear 24, a second helical gear 25, and the like. Further, the geared pulley 23 includes a pulley portion 23B and a gear portion 23A and the gear portion 23A is a helical gear. Here, the first helical gear 24 and the second helical gear 25 respectively function as a first gear and a second gear which rotate around a predetermined rotation axis in the predetermined direction and are coaxial with the predetermined rotation axis. Further, the gear portion 23A functions as a third gear which transmits a driving force from the drive source.

The tilting motor 20 is attached to the panning unit 11 through the rubber 21 and the geared pulley 23 is rotatably supported by the panning unit 11. The tilting motor 20 and the pulley portion 23B of the geared pulley 23 are connected by the timing belt 22. The first helical gear 24 is fixed so that the center substantially coincides with the tilting shaft 15 and is disposed to mesh with the gear portion 23A of the geared pulley 23.

Thus, when the tilting motor 20 is driven, the geared pulley 23 rotates through the timing belt 22 and further the rotation is transmitted to the first helical gear 24 meshing with the gear portion 23A of the geared pulley 23, so that the camera unit 10 can be tilted.

Next, a configuration for removing the backlash of the first helical gear 24 of the tilting drive mechanism 200 will be described with reference to FIG. 3.

Figure 3:
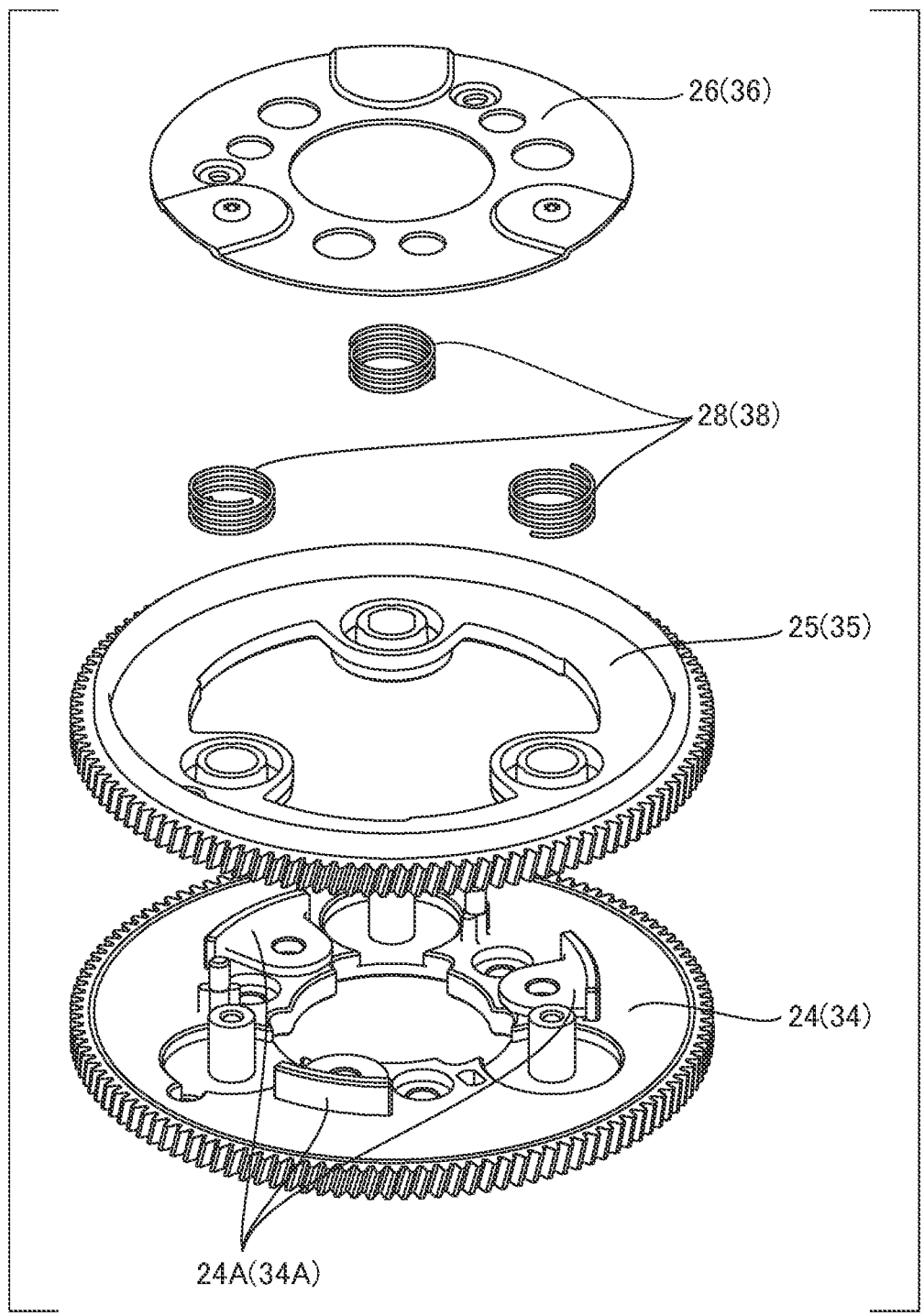
FIG. 3 is an exploded perspective view showing a helical gear of the embodiment.

FIG. 3 is an exploded perspective view showing the helical gears 24 and 25.

As shown in FIG. 3, the second helical gear 25 is disposed not to be rotatable with respect to the first helical gear 24 and to be movable in parallel to the rotation axis direction. Further, the second helical gear 25 is fixed to the first helical gear 24 through a coil spring 28 and a spring retainer 26 and is always biased in the rotation axis direction to approach the first helical gear 24. Furthermore, the plurality of coil springs 28 may be elastic members and function as biasing units.

When the first helical gear 24 meshes with the gear portion 23A of the geared pulley 23, backlash is generated. However, it is possible to remove the backlash as shown in FIG. 4 by biasing the second helical gear 25 with the coil spring 28.

The configuration for removing this backlash is such that the teeth of the gear portion 23A of the geared pulley 23 are sandwiched between the teeth of the first helical gear 24 and the second helical gear 25 and has a so-called scissors gear configuration. With this configuration, when the camera unit 10 is rotated in the tilting direction, rattling due to backlash is removed and smooth operation is enabled.

When the camera unit 10 is rapidly tilted and suddenly stopped, a torque is applied to the second helical gear 25 due to the inertia of the camera unit 10. The force generated in one tooth of the second helical gear 25 by this torque is indicated by F1 of FIG. 4.

Figure 4:
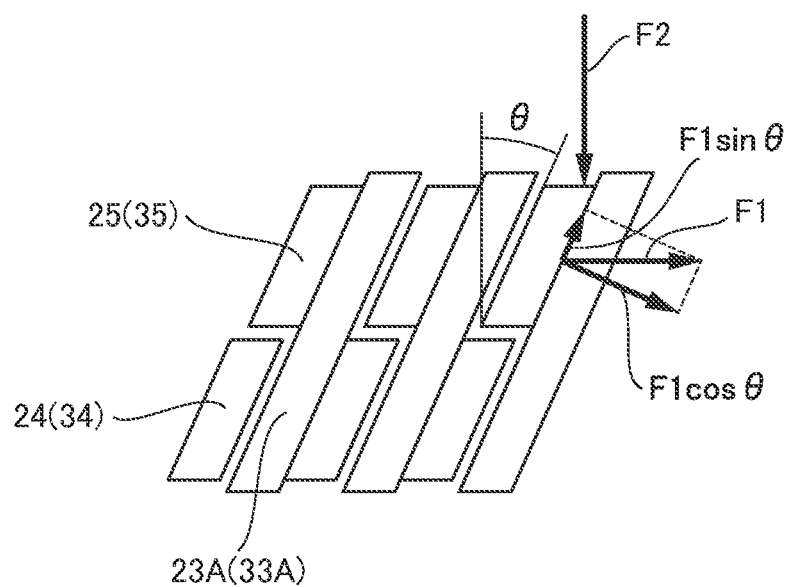
FIG. 4 is a schematic view showing the meshing of the helical gear of the embodiment.

FIG. 4 is a schematic view showing the meshing of the helical gears 24 and 25.

Assuming that the helix angle of the second helical gear 25 is θ, F1 can be divided into F1 cos θ which is a force in the direction perpendicular to the tooth surface and F1 sin θ which is a force in the direction in contact with the tooth surface.

When the second helical gear 25 slips and moves in the axial direction due to F1 sin θ, the configuration for removing backlash cannot be established. Therefore, a configuration that can always remove backlash is maintained by setting the biasing force F2 by the coil spring 28 to a large value and suppressing slippage due to F1 sin θ.

Since F1 sin θ becomes a small value when the helix angle θ is set to a small value the embodiment, θ=15°) of 45° or less, the backlash can be always removed even when the biasing force F2 due to the coil spring 28 is set to be small. Further, it is possible to prevent the second helical gear 25 and the gear portion 23A of the geared pulley 23 from hitting strongly by reducing the biasing force F2. Accordingly, the unevenness of the transmission torque due to the rotation phase of the gear can be reduced and the camera unit 10 can be smoothly tilted.

So far, the configuration for removing the backlash of the first helical gear 24 has been described. By biasing the second helical gear 25 in the thrust direction, the backlash can be removed by sandwiching the teeth of the gear portion 23A of the geared pulley 23. Next, the configuration for biasing the second helical gear 25 will be described in detail.

As shown in FIG. 3, the first helical gear 24 includes three arc-shaped ribs 24A having the same radius of the arc-shaped portion and the arc-shaped ribs 24A are arranged along the circumference around the rotation axis so that the center of the arc substantially coincides with the rotation axis. Further, the inner diameter of the second helical gear 25 is disposed to be fitted to the outer peripheral portion of the arc-shaped rib 24A.

Since there is a slight backlash in the fitting of the inner diameter of the second helical gear 25, the second helical gear 25 may be slightly diagonally tilted due to the backlash.

However, since the outer diameter of the arc-shaped rib 24A is larger than the outer diameter of the tilting shaft 15, the inclination of the second helical gear 25 can be suppressed to be small compared to the case in which the second helical gear 25 is directly fitted to the outer diameter of the tilting shaft 15. Further, the coil springs 28 are arranged alternately with the arc-shaped ribs 24A.

With this configuration, it is possible to apply a biasing force to the vicinity of the outer periphery while maintaining a large fitting diameter of the second helical gear 25. The inclination of the second helical gear 25 due to the variation in the biasing force can be suppressed to be small by applying the biasing force to the vicinity of the outer periphery.

Next, the attachment shape of the tilting motor 20 in the tilting drive mechanism 200 will be described with reference to FIG. 2. The tilting motor 20 is attached to a support metal plate 27 through the rubber 21 and the support metal plate 27 is attached to the pan base 16. Further, the driving force of the tilting motor 20 can be transmitted to the geared pulley 23 by the timing belt 22.

Since both the rubber 21 and the timing belt 22 are members having low rigidity, the vibration of the tilting motor 20 is less likely to be transmitted to the pan base 16 or the geared pulley 23. Accordingly, it is possible to prevent the image being captured from shaking due to the vibration of the tilting motor 20.

Next, the panning drive mechanism 300 of the video camera 100 will be described. The panning drive mechanism (panning drive unit) 300 functions as a rotational drive unit which rotates the camera unit 100 in a predetermined panning direction.

Figure 5:
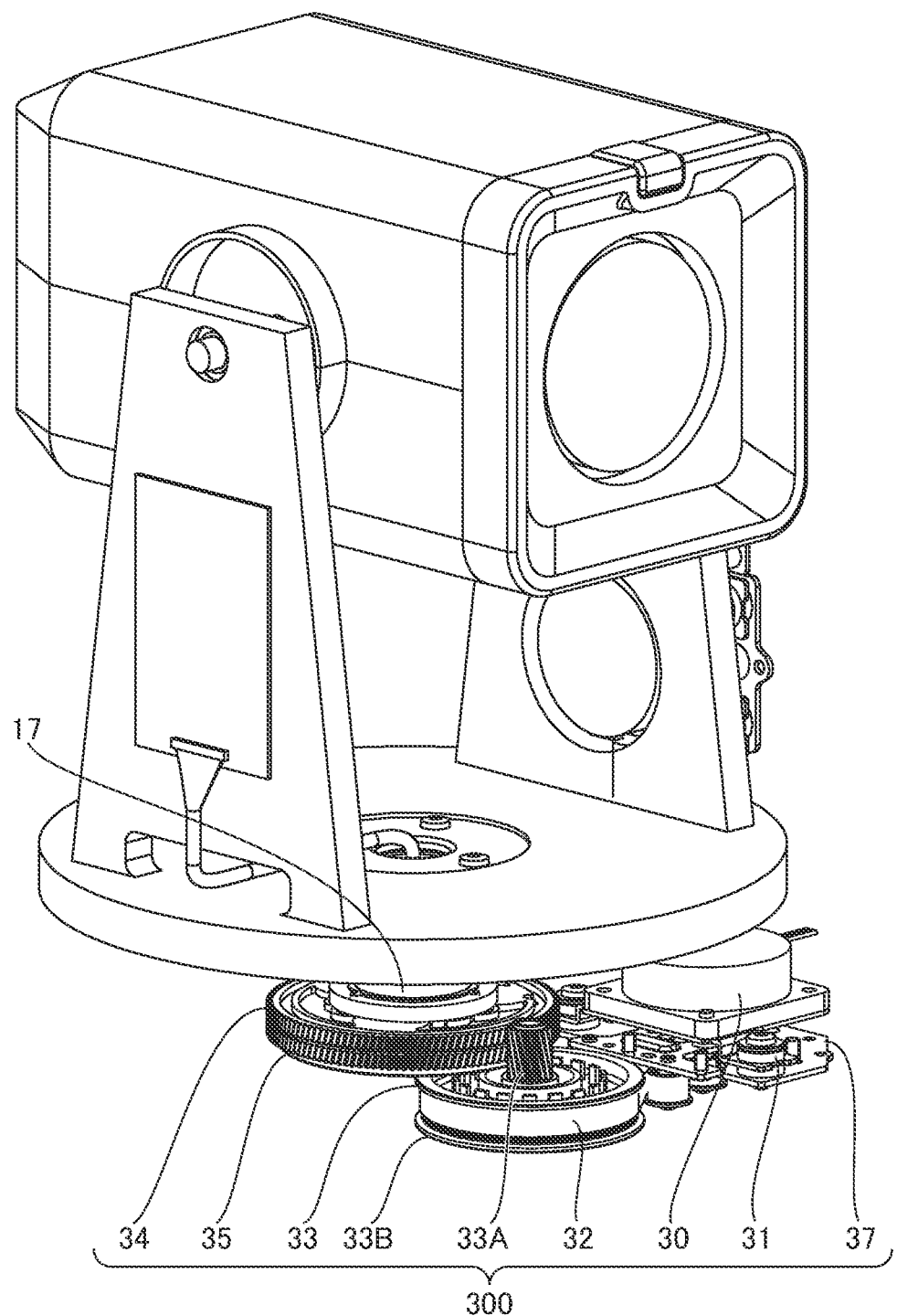
FIG. 5 is a perspective view showing a panning drive mechanism of the video camera of the embodiment.

FIG. 5 is a perspective view showing the panning drive mechanism 300 of the video camera 100. As shown in FIG. 5, the pan base 16 includes a panning shaft 17 and is supported by the base portion 12 to be pan-rotatable.

The rotation of the camera unit 10 in the panning direction is performed by the panning drive mechanism 300. As shown in Fig, 5, the panning drive mechanism 300 includes a pan motor 30, a rubber 31, a timing belt 32, a geared pulley 33, a first helical gear 34, a second helical gear 35, and the like. Further, the geared pulley 33 includes a pulley portion 33B and a gear portion 33A and the gear portion 33A is a helical gear.

The pan motor 30 is attached to the base portion 12 through the rubber 31 and the geared pulley 33 is rotatably supported by the base portion. The pan motor 30 and the pulley portion 33B of the geared pulley 33 are connected by the timing belt 32. The first helical gear 34 is fixed so that the center substantially coincides with the panning shaft 17 and is disposed to mesh with the gear portion 33A of the geared pulley 33.

Thus, when the pan motor 30 is driven, the geared pulley 33 rotates through the timing belt 32 and further the rotation is transmitted to the first helical gear 34 meshing with the gear portion 33A of the geared pulley 33. Then, the pan base 16 can be panned and hence the camera unit 10 can be panned.

The second helical gear 35 is disposed not to be rotatable with respect to the first helical gear 34 and to be movable in parallel to the rotation axis direction. As shown in FIG. 3, the second helical gear 35 is fixed to the first helical gear 34 through the coil spring 38 and the spring retainer 36 and is always biased in the direction to approach the first helical gear 34.

The pan motor 30 is attached to the support metal plate 37 through the rubber 31 and the support metal plate 37 is attached to the base portion 12.

These configurations are the same as those of the tilting drive mechanism 200 and the panning can be smoothly performed by removing backlash.

Figure 6:
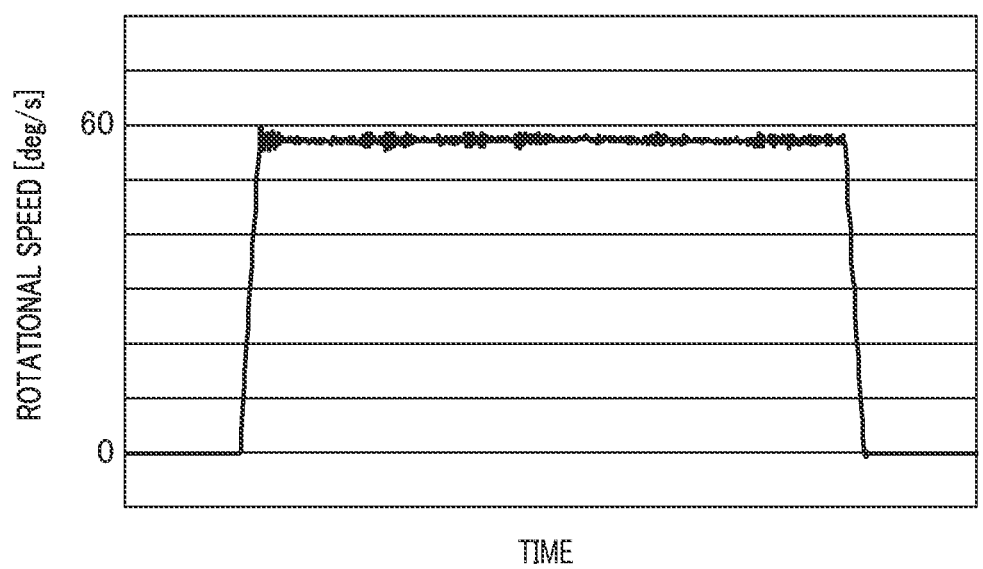
FIG. 6 is a graph plotting panning speed characteristics of the video camera of the embodiment.
Figure 7:
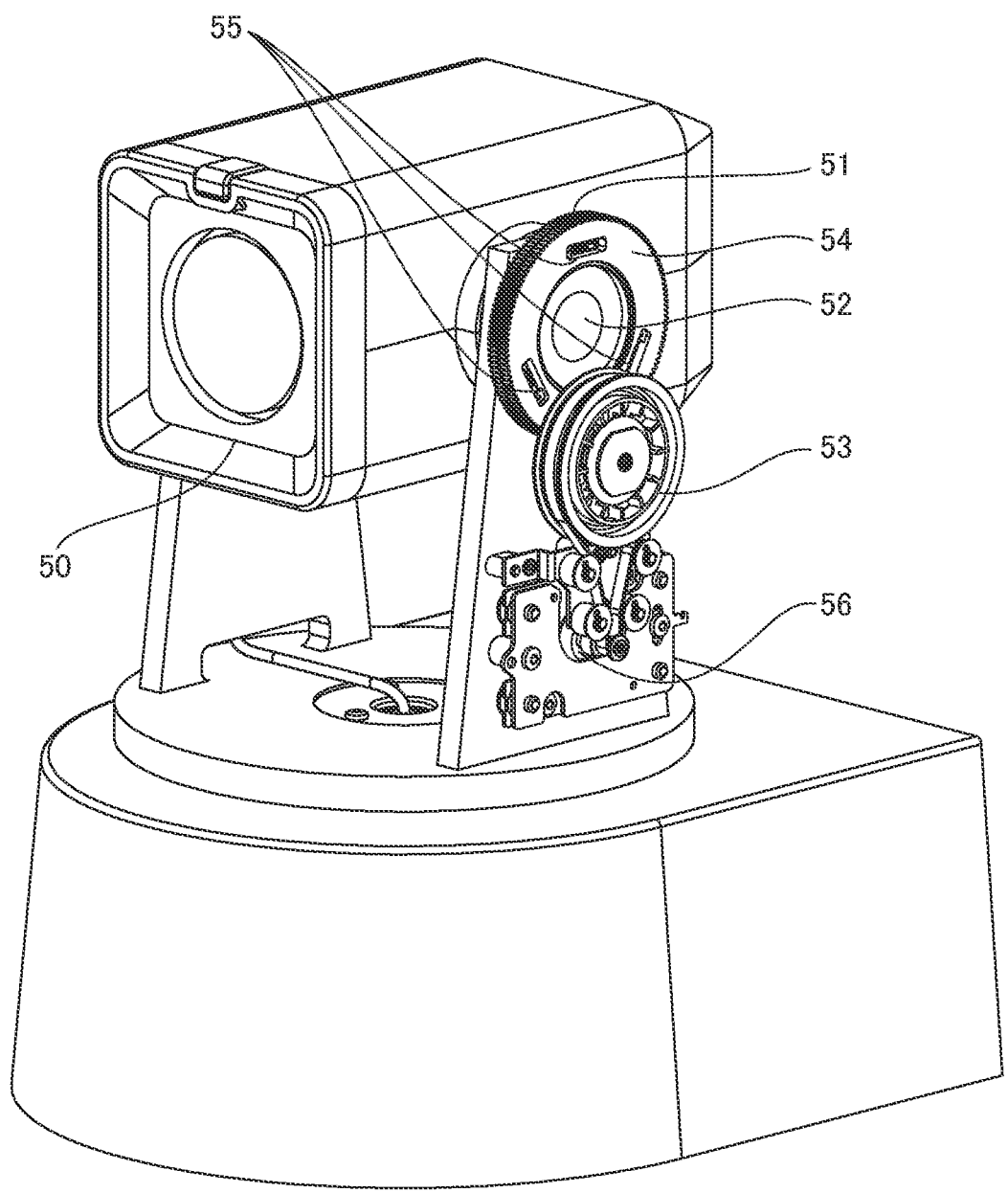
FIG. 7 is a perspective view showing an example of a drive mechanism of a conventional video camera.
Figure 8:
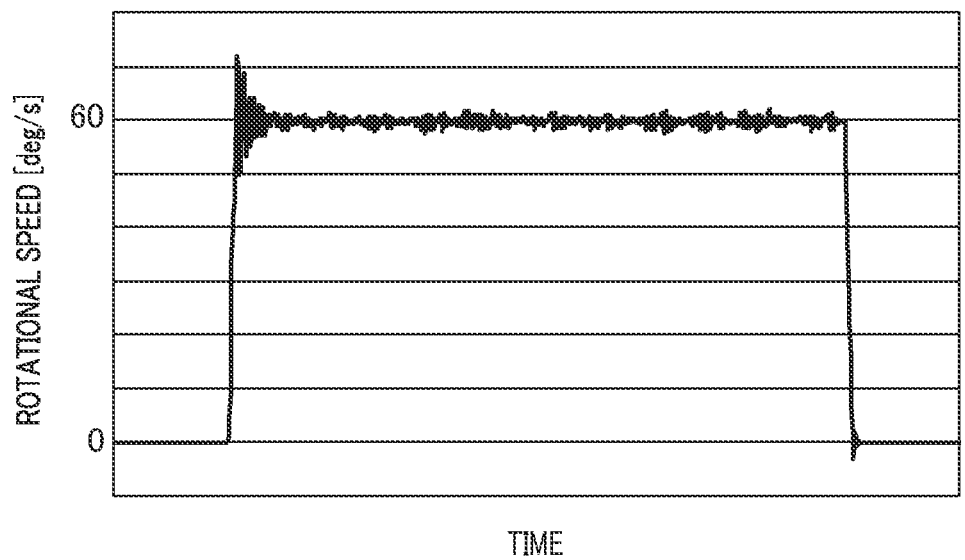
FIG. 8 is a graph plotting an example of panning speed characteristics of the conventional video camera.
Figure 9:
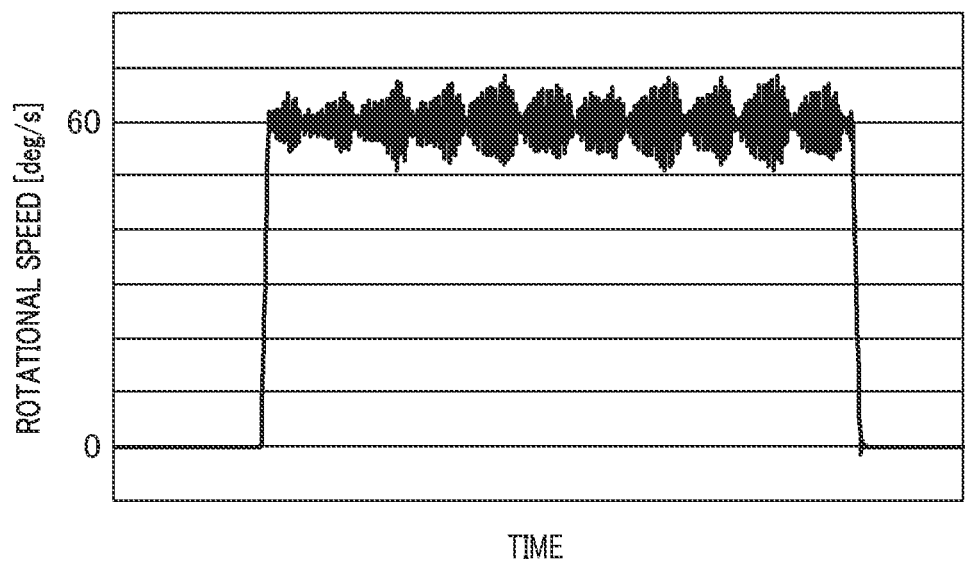
FIG. 9 is a graph plotting another example of panning speed characteristics of the conventional video camera.

FIG. 6 is a graph plotting the panning speed characteristics of the video camera 100.

Vibration is not generated by reducing backlash even in the sudden acceleration or stop and a smooth rotation with little unevenness in speed is allowed even in the rotation at a constant speed.

In the embodiment, the camera unit 10 is rotatable in the tilting direction and the panning direction, but may be rotatable in any one of the tilting direction and the panning direction.

Further, in the embodiment, the tilting drive mechanism 200 and the panning drive mechanism 300 are decelerated in two stages, but may be deceleration mechanisms having three or more stages.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

This application claims the benefit of Japanese Patent Application No. 2020-187342 filed on Nov. 10, 2020, which is hereby incorporated by reference herein in its entirety.

What is claimed is:

1. A pan or tilt head comprising:
    a drive unit which rotates a camera unit in a predetermined direction;
    first and second gears which rotate around a predetermined rotation axis in the predetermined direction and are coaxial with the predetermined rotation axis;
    a third gear which meshes with the first and second gears and transmits a driving force from the drive unit; and
    a plurality of biasing units which biases the second gear in the rotation axis direction and is arranged along a circumference centered on the predetermined rotation axis,
    wherein the first gear, the second gear, and the third gear include helical gears,
    wherein the second gear is disposed to be movable in the rotation axis direction with respect to the first gear,
    wherein the first gear includes a plurality of arc-shaped ribs, and
    wherein the plurality of biasing units is arranged alternately with the arc-shaped ribs along the circumference.

2. The pan or tilt head according to claim 1,
    wherein helix angles of the first gear, the second gear, and the third gear are 45° or less.

3. The pan or tilt head according to claim 1,
    wherein the third gear includes a pulley portion which meshes with a timing belt.

4. The pan or tilt head according to claim 3,
    wherein the pulley portion is configured to transmit a driving force from the drive unit by the timing belt.

5. The pan or tilt head according to claim 1,
    wherein the a plurality of arc-shaped ribs have a same radius of an arc-shaped portion,
    wherein the arc-shaped ribs are arranged so that the center of the arc substantially coincides with the rotation axis, and
    wherein a part of the second gear is fitted to an outer peripheral portion of the arc-shaped rib.

6. The pan or tilt head according to claim 1,
    wherein the predetermined direction includes at least one of a panning direction and a tilting direction.

7. The pan or tilt head according to claim 1, further comprising:
    a panning drive unit which rotates the camera unit in a panning direction; and
    a tilting drive unit which rotates the camera unit in a tilting direction,
    wherein each of the panning drive unit and the tilting drive unit includes the drive unit, the first gear, the second gear, and the third gear,
    wherein the first gear, the second gear, and the third gear includes helical gears,
    wherein the second gear is disposed to be movable in the rotation axis direction with respect to the first gear, and
    wherein the biasing unit is provided to bias the second gear in the rotation axis direction.

8. An imaging device comprising:
    a pan or tilt head which includes a drive unit for rotating a camera unit in a predetermined direction, first and second gears for rotating around a predetermined rotation axis in the predetermined direction and coaxial with the predetermined rotation axis, a third gear for meshing with the first and second gears and for transmitting a driving force from the drive unit, and a plurality of biasing units for biasing the second gear in the rotation axis direction and arranged along a circumference centered on the predetermined rotation axis; and
    the camera unit which is attachable to the pan or tilt head,
    wherein the first gear, the second gear, and the third gear include helical gears,
    wherein the second gear is disposed to be movable in the rotation axis direction with respect to the first gear,
    wherein the first gear includes a plurality of arc-shaped ribs, and
    wherein the plurality of biasing units is arranged alternately with the arc-shaped ribs along the circumference.

* * * * *